United States Patent
Sakata et al.

(10) Patent No.: US 9,419,929 B2
(45) Date of Patent: Aug. 16, 2016

(54) ELECTRONIC MAIL DATA PROCESSING DEVICE AND METHOD FOR PROCESSING ELECTRONIC MAIL DATA

(75) Inventors: Ryuji Sakata, Kariya (JP); Soichi Saito, Nagoya (JP); Suguru Matsushita, Obu (JP); Shinichi Yamamoto, Toyota (JP); Kazushige Hayashi, Toyota (JP); Masao Sasaki, Okazaki (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 507 days.

(21) Appl. No.: 13/313,365

(22) Filed: Dec. 7, 2011

(65) Prior Publication Data

US 2012/0150976 A1 Jun. 14, 2012

(30) Foreign Application Priority Data

Dec. 13, 2010 (JP) ................. 2010-277008

(51) Int. Cl.
*G06F 15/16* (2006.01)
*H04L 12/58* (2006.01)
*H04M 1/725* (2006.01)
*H04M 1/60* (2006.01)

(52) U.S. Cl.
CPC ............ *H04L 51/22* (2013.01); *H04M 1/7253* (2013.01); *H04L 51/38* (2013.01); *H04M 1/6091* (2013.01); *H04M 1/72552* (2013.01); *H04M 2250/02* (2013.01)

(58) Field of Classification Search
CPC ..... G06Q 10/107; H04L 12/585; H04L 12/58
USPC ...................................... 709/206
See application file for complete search history.

(56) References Cited

U.S. PATENT DOCUMENTS

2005/0076087 A1*  4/2005  Budd et al. ............... 709/206
2008/0250098 A1*  10/2008  Oishi ........................ 709/202

(Continued)

FOREIGN PATENT DOCUMENTS

JP    2000-194613     7/2000
JP    2000-293389     10/2000

(Continued)

OTHER PUBLICATIONS

U.S. Appl. No. 13/200,158, filed Sep. 20, 2011, Matsushita et al.

(Continued)

*Primary Examiner* — Chris Parry
*Assistant Examiner* — Alan S Chou
(74) *Attorney, Agent, or Firm* — Harness, Dickey & Pierce, P.L.C.

(57) ABSTRACT

A communication unit connects an e-mail data transfer protocol to transfer e-mail data items with an external device. An e-mail data storage unit stores the e-mail data items transferred from the external device. The control unit does not cause the external device to transfer the e-mail data items when the e-mail data transfer protocol is connected and when a total number of subjects of the e-mail data items and a data content of a latest e-mail data item stored in the external device respectively coincide with a total number of subjects of the e-mail data items and a data content of a latest e-mail data item stored in the e-mail data storage unit, at the time point when the e-mail data transfer protocol is connected between the communication unit and the external device.

10 Claims, 5 Drawing Sheets

(56) References Cited

U.S. PATENT DOCUMENTS

| | | |
|---|---|---|
| 2010/0151833 A1 | 6/2010 | Azuma et al. |
| 2010/0248693 A1* | 9/2010 | Suzuki .................... H04L 51/22 455/412.1 |

FOREIGN PATENT DOCUMENTS

| | | |
|---|---|---|
| JP | 2004-135048 | 4/2004 |
| JP | 2004-252563 | 9/2004 |
| JP | 2006-033377 | 2/2006 |
| JP | 2008-257484 | 10/2008 |

OTHER PUBLICATIONS

U.S. Appl. No. 13/316,853, filed Dec. 12, 2011, Sakata et al.

Office action dated Feb. 4, 2014 in corresponding Japanese Application No. 2010-277008.

* cited by examiner

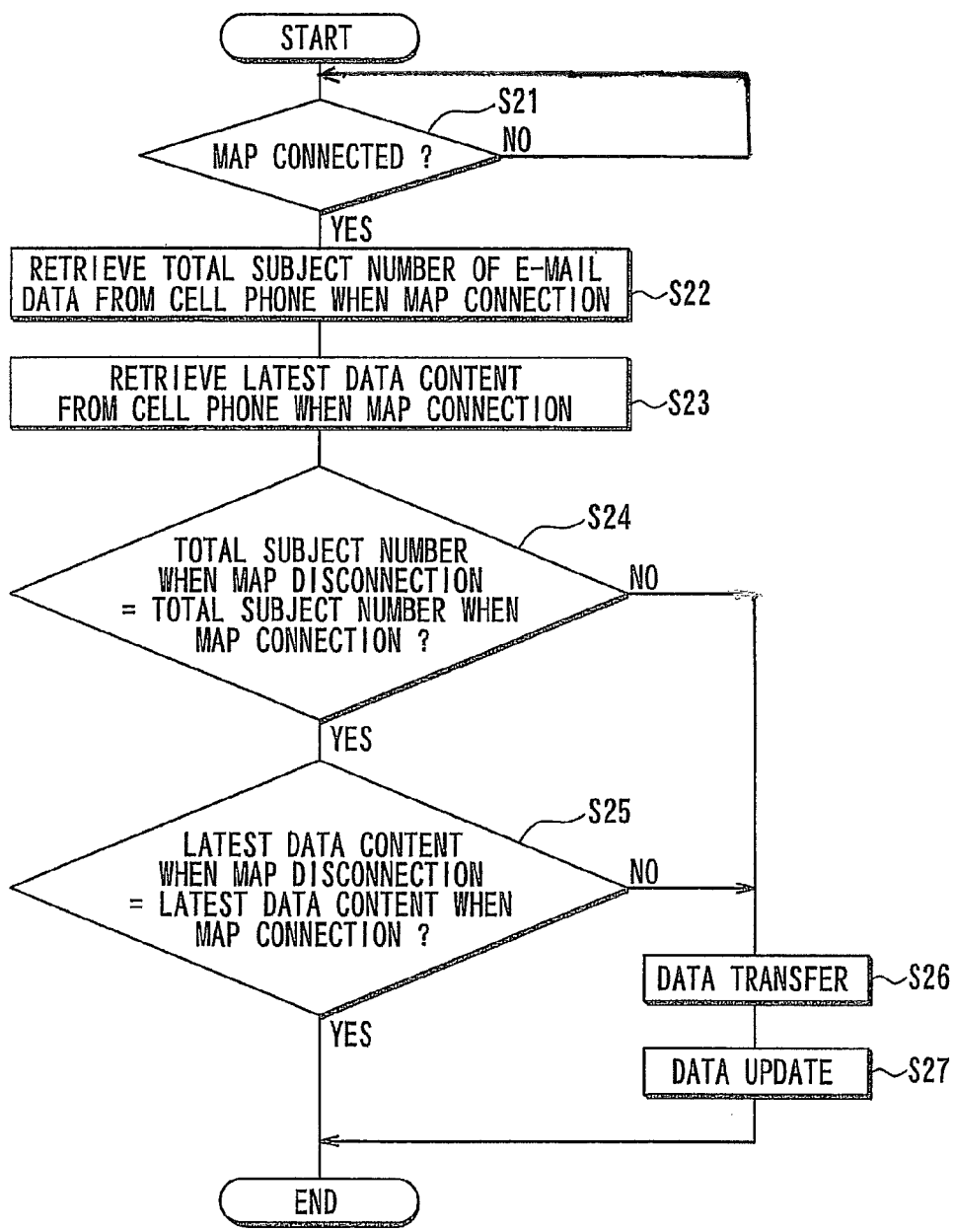

ELECTRONIC MAIL DATA PROCESSING DEVICE AND METHOD FOR PROCESSING ELECTRONIC MAIL DATA

CROSS REFERENCE TO RELATED APPLICATIONS

This application is based on and claims priority to Japanese Patent Application No. 2010-277008 filed on Dec. 13, 2010, the contents of which are incorporated in their entirely herein by reference.

FIELD OF THE INVENTION

The present invention relates to an electronic mail data processing device (e-mail data processing device) configured to retrieve electronic mail data (e-mail data) transferred from an external device storing the e-mail data and to process the transferred e-mail data. The present invention further relates to a method for processing electronic mail data.

BACKGROUND OF THE INVENTION

For example, JP-A-2004-252563, JP-A-2006-33377 disclose a configuration including a cellular phone device and a vehicular device. The cellular phone device is configured to implement near-field wireless communications and carried in a vehicle interior. The vehicular device is equipped in the vehicle and also configured to implement near-field wireless communications. When the cellular phone device carried in the vehicle interior is communicable with the vehicular device via the near-field wireless communications, connection of an e-mail data transfer protocol is made between the cellular phone device and the vehicular device for transmission of e-mail data. Thereby, near-field wireless communications are enabled between the cellular phone device and the vehicular device. At this time, a user manipulates the vehicular device to cause the cellular phone device to transfer the e-mail data stored in the cellular phone device to the in-vehicle device thereby to browse the e-mail data stored in the cellular phone device. Thus, the e-mail data stored in the vehicular device is updated with the e-mail data transferred from the cellular phone device.

It is noted that, in a time period in which e-mail data is transferred and in a time period in which e-mail data is updated, a user cannot read the e-mail data by manipulating the vehicular device. It is conceivable to employ a configuration in which an e-mail data transfer processing is implemented to transfer the e-mail data, each time when a cellular phone device and a vehicular device connect an e-mail data transfer protocol therebetween. In such a configuration, immediately after making the connection of the e-mail data transfer protocol, a user cannot read e-mail data. Consequently, sufficient operability cannot be produced. In addition, when a configuration is employed to transfer e-mail data via wireless communications, it is also conceivable to cause instantaneous disconnection (momentary disconnection) in the communication channel. Therefore, when a configuration is employed to implement an e-mail data transfer processing and an e-mail data update processing each time when the e-mail data transfer protocol is re-connected in response to the instantaneous disconnection, processing load may be increased unnecessarily.

SUMMARY OF THE INVENTION

In view of the foregoing and other problems, it is an object of the present invention to produce an e-mail data processing device configured to retrieve e-mail data from an external device and process the retrieved e-mail data with high user's operability and less processing load. It is another object of the present invention to produce a method for processing the electronic mail data.

According to an aspect of the present invention, an electronic mail data processing device comprises a communication unit configured to connect an e-mail data transfer protocol to transfer e-mail data items with an external device configured to store the e-mail data items. The electronic mail data processing device further comprises an e-mail data retrieval unit configured to retrieve the e-mail data items transferred from the external device when the e-mail data transfer protocol is connected between the communication unit and the external device. The electronic mail data processing device further comprises an e-mail data storage unit configured to store the e-mail data items transferred from the external device and retrieved by the e-mail data retrieval unit. The electronic mail data processing device further comprises a control unit configured to: implement an e-mail data transfer processing to cause the external device to transfer the e-mail data items; and implement an e-mail data update processing to update the e-mail data items stored in the e-mail data storage unit to the e-mail data items transferred from the external device and retrieved by the e-mail data retrieval unit. The electronic mail data processing device further comprises an e-mail total subject number retrieval unit configured to retrieve a total number of subjects of the e-mail data items stored in the external device when the e-mail data transfer protocol is connected between the communication unit and the external device. The electronic mail data processing device further comprises a latest data content retrieval unit configured to retrieve a data content of a latest e-mail data item stored in the external device when the e-mail data transfer protocol is connected between the communication unit and the external device. The control unit is further configured not to implement the e-mail data transfer processing, when the e-mail data transfer protocol is connected between the communication unit and the external device, and when the following both conditions are satisfied: i) the total number of subjects of the e-mail data items stored in the external device at the time point when the e-mail data transfer protocol is connected, the total number being retrieved by the e-mail total subject number retrieval unit from the external device, coincides with a total number of subjects of the e-mail data items stored in the e-mail data storage unit at the time point when the e-mail data transfer protocol is connected; and ii) the data content of the latest e-mail data stored in the external device at the time point when the e-mail data transfer protocol is connected, the data content of the latest e-mail data being retrieved by the latest data content retrieval unit from the external device, coincides with a data content of a latest e-mail data stored in the e-mail data storage unit at the time point when the e-mail data transfer protocol is connected.

According to another aspect of the present invention, a method for processing electronic mail data, the method comprises connecting an e-mail data transfer protocol to transfer e-mail data items between an electronic mail data processing device and an external device storing the e-mail data items. The method further comprises causing the electronic mail data processing device to retrieve the e-mail data items transferred from the external device when the e-mail data transfer protocol is connected. The method further comprises causing the electronic mail data processing device to store the e-mail data items transferred and retrieved from the external device. The method further comprises causing the electronic mail data processing device to retrieve a total number of subjects of the e-mail data items stored in the external device when the e-mail data transfer protocol is connected. The method further comprises causing the electronic mail data processing device to retrieve a data content of a latest e-mail data items stored in the external device when the e-mail data transfer protocol is connected. The method further comprises first determining whether the total number of subjects of the e-mail data items stored in the external device at a time point when the e-mail data transfer protocol is connected, the total number of subjects of the e-mail data items being retrieved by the electronic mail data processing device from the external device, coincides with a total number of subjects of the e-mail data items stored in the electronic mail data processing device at the time point when the e-mail data transfer protocol is connected. The method further comprises second determining whether the data content of the latest e-mail data item stored in the external device at a time point when the e-mail data transfer protocol is connected, the data content of the latest e-mail data item being retrieved by the electronic mail data processing device from the external device, coincides with a data content of latest e-mail data stored in the electronic mail data processing device at the time point when the e-mail data transfer protocol is connected. The method further comprises avoiding implementation of an e-mail data transfer processing, which is to cause the external device to transfer the e-mail data items to the electronic mail data processing device, when the e-mail data transfer protocol is connected, and when both the first determining and the second determining make positive determinations. The method further comprises implementing the e-mail data transfer processing to cause the external device to transfer the e-mail data items to the electronic mail data processing device and implementing an e-mail data update processing to update the e-mail data items stored in the electronic mail data processing device to the e-mail data items transferred from the external device and retrieved by the electronic mail data processing device when at least one of the first determining and the second determining makes a negative determination.

BRIEF DESCRIPTION OF THE DRAWINGS

The above and other objects, features and advantages of the present invention will become more apparent from the following detailed description made with reference to the accompanying drawings. In the drawings:

FIG. 4 is a flow chart showing a MAP connection monitor processing;

DETAILED DESCRIPTION OF PREFERRED EMBODIMENTS

Embodiment

Figure 1:
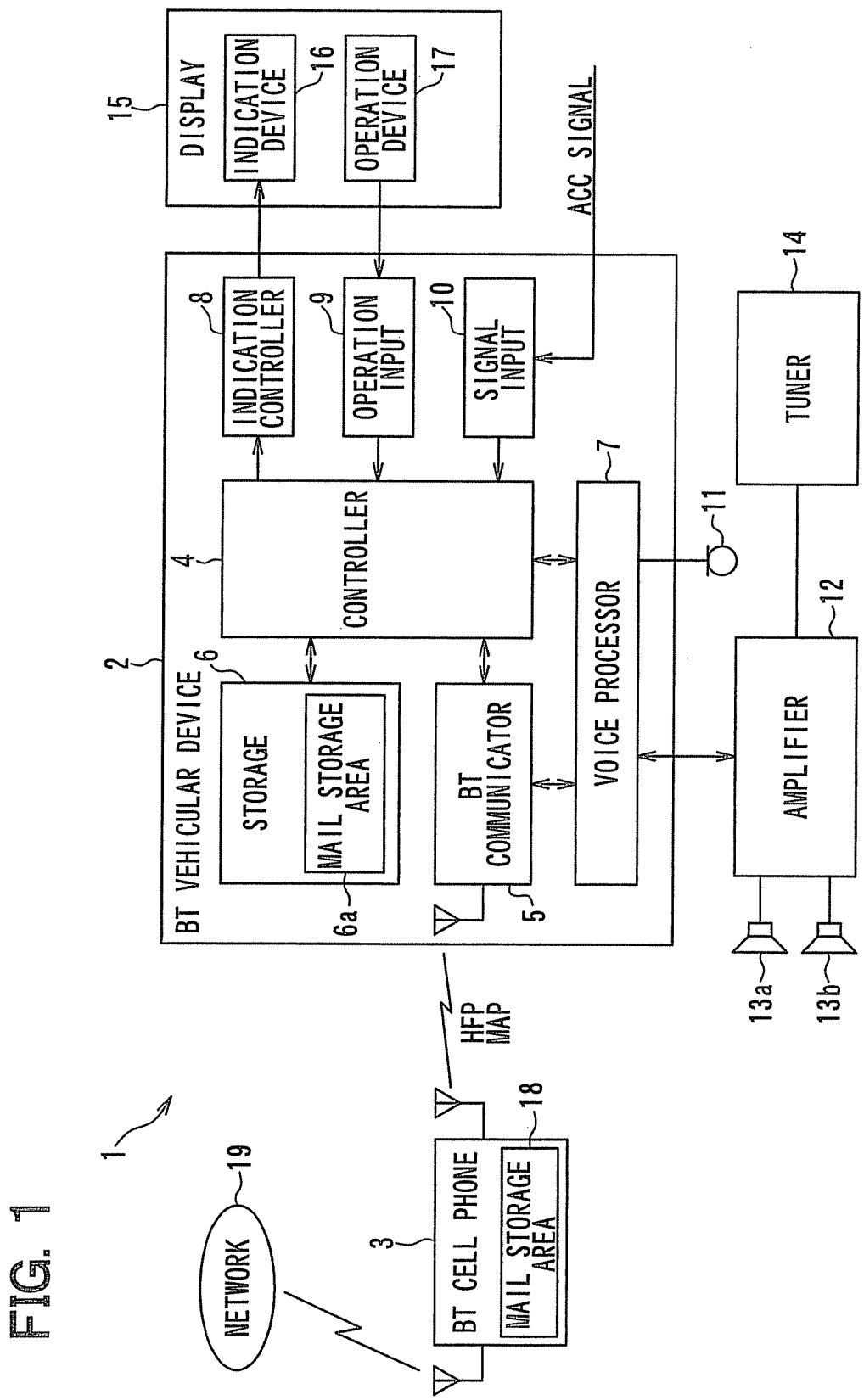
FIG. 1 is a functional block diagram showing a vehicular device according to an embodiment.

As follows, an embodiment will be described with reference to drawings. In the present description, it is supposed that a vehicle has a vehicular device having a Bluetooth (BT: registered trademark) communication function. That is, the vehicular device is a BT-adapted vehicular device. The vehicular device is an example of a vehicular apparatus with a near-field wireless communication function. Further, it is supposed that a BT-adapted cellular-phone device having the BT communication function is carried into an interior of the vehicle. In the present state, the vehicular device and the cellular phone device are communicable via the BT communication function.

A BT communications system 1 includes a vehicular device 2 equipped in the vehicle and a cellular phone device 3 carried into the vehicle interior. The vehicular device 2 may be equivalent to an e-mail data processing device. The cellular phone device 3 may be equivalent to an external device. The vehicular device 2 includes a control unit 4, a BT communication unit 5, a storage unit 6, a voice processing unit 7, a display control unit 8, an operation input unit 9, and a signal input unit 10. The control unit 4 may be equivalent to a control unit. The BT communication unit 5 may be equivalent to a communication unit, an e-mail data retrieval unit, an e-mail total subject number retrieval unit, and a latest data content retrieval unit. The storage unit 6 may be equivalent to an e-mail data storage unit.

The control unit 4 may be a generally-known microcomputer including a CPU, a RAM, a ROM, an I/O bus, and the like. The control unit 4 controls an operation such as a communication and a data management of the vehicular device 2. The BT communication unit 5 has a function to implement BT communications with the cellular phone device 3. More specifically, the BT communication unit 5 may be configured to implement concurrent connection (multi-connection) by using multiple profiles specified by the BT telecommunications standard, such as the handsfree profile (HFS), which specifies handsfree communications, and the message access profile (MAP), which specifies transmission of e-mail data. The e-mail (electronic mail) is a general term of information such as a character message and image information exchanged via a generally-known computer network. The HFP and the MAP are communication protocols assigned respectively to functions. The phone book access profile (PBAP), which specifies transmission of telephone directory data, the object push profile (OPP), which specifies transmission of various data, and the like may be used in the connection, in addition to the HFP and MAP.

The storage unit 6 has a storage area for storing various data. Specifically, the storage unit 6 has an e-mail data storage area 6a for storing e-mail data transferred from the cellular phone device 3 and retrieved by the BT communication unit 5. The e-mail data is associated with sender information, receiving time and date information, classification information, and the like. The sender information can be used for identification of a sender (or destination) of an e-mail. The receiving time and date information can be used for identification of the date and time when the cellular phone device 3 receives an e-mail from an e-mail server connected to a communication network 19. The classification information can be used for identification of a classification of an e-mail. For example, the classification information may include a subject name information and the like used for identification of a subject name of an e-mail inputted by a sender.

The e-mail data storage area 6a has a storage capacity sufficient to store e-mail data transferred from the cellular phone device 3 by one connection via the MAP. The e-mail data storage area 6a has a function to sort and store the e-mail data in the reverse chronological order from a new item to an old item according to a receiving date and time. That is, when the e-mail data transferred from the cellular phone device 3 is sorted in the reverse chronological order according to the receiving date and time, the e-mail data storage area 6a stores the e-mail data transferred from the cellular phone device 3 in the reverse chronological order according to the receiving date and time, as it is. Alternatively, when the e-mail data transferred from the cellular phone device 3 is not sorted in the reverse chronological order according to the receiving date and time, the e-mail data storage area 6a sorts the e-mail data transferred from the cellular phone device 3 in the reverse chronological order according to the receiving date and time, and stores the sorted data.

In addition to the e-mail data storage area 6a for storing the e-mail data, the storage unit 6 further has a telephone directory data storage area, an outgoing history data storage area, an incoming historical-data storage area, and the like. The telephone directory data storage area is for storing telephone directory data transferred from the cellular phone device 3 and retrieved by the BT communication unit 5. The outgoing history data storage area is for storing outgoing history data representing correspondence between an outgoing time and an outgoing telephone number related to an outgoing operation from the cellular phone device 3, which connects with the vehicular device 2 via the HFP, or an outgoing operation from the vehicular device 2. The incoming historical-data storage area is for storing incoming historical data representing correspondence between an incoming time related to an incoming operation of the cellular phone device 3, which connects with the vehicular device 2 via the HFP, and an incoming telephone number.

The voice processing unit 7 is connected with a microphone 11 and an audio amplifier 12. The microphone 11 is located in the vehicle interior. More specifically, for example, the microphone 11 is located at a position, for example, close to a handle, such that the microphone 11 can easily collect voice of a user. The audio amplifier 12 is an exterior device of the vehicular device 2 and connected with two speakers 13a and 13b.

In the state where the BT communication unit 5 is connected with the cellular phone device 3 via the HFP and when inputting a voice of a user as transmission audio data from the microphone 11, the voice processing unit 7 implements audio processing to the inputted transmission audio data. Thus, the voice processing unit 7 outputs the audio-processed data to the BT communication unit 5. In the same state, when inputting incoming voice data from the BT communication unit 5, the voice processing unit 7 outputs the inputted incoming voice data to the audio amplifier 12.

When the audio amplifier 12 inputs incoming voice data from the voice processing unit 7, the audio amplifier 12 amplifies the inputted incoming voice data and causes the speakers 13a and 13b to output the amplified data. The audio amplifier 12 is further connected with a tuner deck 14. For example, the audio amplifier 12 inputs an audio signal of audio contents such as a music content retrieved from a recording medium and a radio program received from a radio station using the tuner deck 14. The audio amplifier 12 amplifies the audio signal and causes the speakers 13a and 13b to output the audio contents.

A display device 15 includes an indication device 16 and an operation device 17. The indication device 16 indicates various information. The operation device 17 has a touch sensor on a display screen. The display control unit 8 inputs an indication instruction signal from the control unit 4 and controls indication of information on the indication device 16 of the display device 15 based on the inputted indication instruction signal. The operation input unit 9 inputs instruction of a user according to a user's operation of the touch sensor of the operation device 17 via the display screen. The operation input unit 9 outputs an operation detection signal of the inputted instruction to the control unit 4. The control unit 4 analyzes the operation detection signal inputted from the operation input unit 9 and thereby to specify the user's operation.

The signal input unit 10 is connected to an accessory switch device (ACC switch device) equipped in the vehicle. When the signal input unit 10 inputs an ACC signal outputted from the ACC switch device, the signal input unit 10 outputs the inputted ACC signal to the control unit 4. Thereby, the control unit 4 activates and deactivates a device power source according to the activation and deactivation of the ACC signal inputted from the signal input unit 10. That is, the control unit 4 activates device power source to activate the vehicular device 2 at the time point when the ACC signal is switched from OFF to ON. In addition, the control unit 4 deactivates device power source to deactivate the vehicular device 2 at the time point when the ACC signal is switched from ON to OFF. Even after the vehicular device 2 is stopped, the control unit 4 switches from a normal operation mode to a low-power-consumption operation mode and continues its operation. Thereby, the control unit 4 is configured to store the total subject number of the e-mail data stored in the e-mail data storage area 6a and the contents of data of the latest e-mail data. The present function will be described later in detail.

The cellular phone device 3 includes a control unit, a telecommunication unit, a BT communication unit, a key unit, a storage unit, a display unit, a microphone, a speaker, and the like. The control unit controls of an entire operation of the cellular phone device 3. The telecommunication unit implements telephonic communications with the communication network 19. The BT communication unit implements the BT communications. The key unit includes various keys arranged on the key unit and operated by a user. The storage unit has an e-mail data storage area 18 for storing the e-mail data related to an e-mail transmitted from the communication network 19 and received by the telecommunication unit. The display unit displays various information on a display screen. The microphone inputs voice of a user. The speaker outputs voice received from a counterpart. In this case, the BT communication unit of the cellular phone device 3 has a function to implement the BT communications with the vehicular device 2 and is configured to implement concurrent connection via multiple profiles, such as the HFP and the MAP, specified by the BT telecommunications standard, similarly to the BT communication unit 5 of the vehicular device 2.

Similarly to the e-mail data storage area 6a of the vehicular device 2, the e-mail data storage area 18 has a function to sort the e-mail data in the reverse chronological order according to the receiving date and time and to store the sorted data. That is, the e-mail data storage area 18 sorts e-mail data, which is related to e-mails transmitted from the communication network 19 and received by the telecommunication unit, in the reverse chronological order according to the receiving date and time. The e-mail data storage area 18 further stores the sorted data. The communication network 19 includes a cellular-phone base station and a facility, which provides a generally-known communication service, such as a base station control, for a cellular phone.

In the above-described configuration, the control unit 4 regularly connects the MAP when the BT communication unit 5 and the cellular phone device 3 connect the BT communication channel. In addition, when the MAP connection is made between the BT communication unit 5 and the cellular phone device 3, the control unit 4 causes the BT communication unit 5 to transmit a total subject number request command to the cellular phone device 3. Thereby, the control unit 4 causes the cellular phone device 3 to transfer the total number of the e-mail data items stored in the cellular phone device 3 at that time. Thus, the control unit 4 retrieves the total number of the e-mail data items transferred from the cellular phone device 3 via the BT communication unit 5.

In addition, when the MAP connection is made between the BT communication unit 5 and the cellular phone device 3, the control unit 4 causes the BT communication unit 5 to transmit latest data content request command to the cellular phone device 3. Thereby, the control unit 4 causes the cellular phone device 3 to transfer the data content of the latest e-mail data item stored in the cellular phone device 3 at that time. Thus, the control unit 4 retrieves the data content of the latest e-mail data item transferred from the cellular phone device 3 via the BT communication unit 5. The data content may include a content distinguishable among the e-mail data items. For example, data content may include the sender information, the receiving time and date information, the classification information, and/or the subject name information. The data content may be a text of the e-mail item.

The control unit 4 is further configured to implement an e-mail data transfer processing to cause the BT communication unit 5 to transmit an e-mail data request command to the cellular phone device 3 thereby to cause the cellular phone device 3 to transfer the e-mail data item stored in the cellular phone device 3 at that time. The control unit 4 is further configured to implement to implement an e-mail data update processing. Specifically, when the BT communication unit 5 retrieves the e-mail data transferred from the cellular phone device 3, the control unit 4 causes the e-mail data storage area 6a to store (overwrite) the e-mail data item transferred from the cellular phone device 3 and retrieved by the BT communication unit 5. Thereby, the control unit 4 updates the e-mail data stored in the e-mail data storage area 6a.

Figure 2:
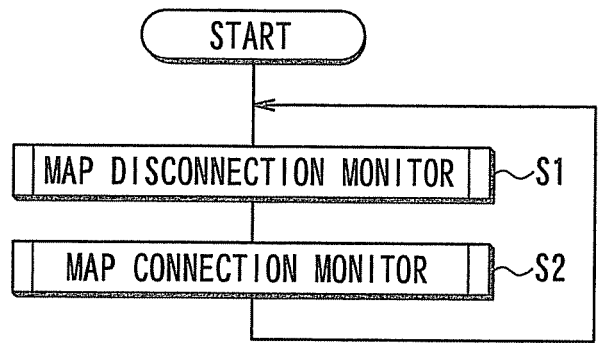
FIG. 2 is a flowchart showing an operation of the vehicular device.
Figure 3:
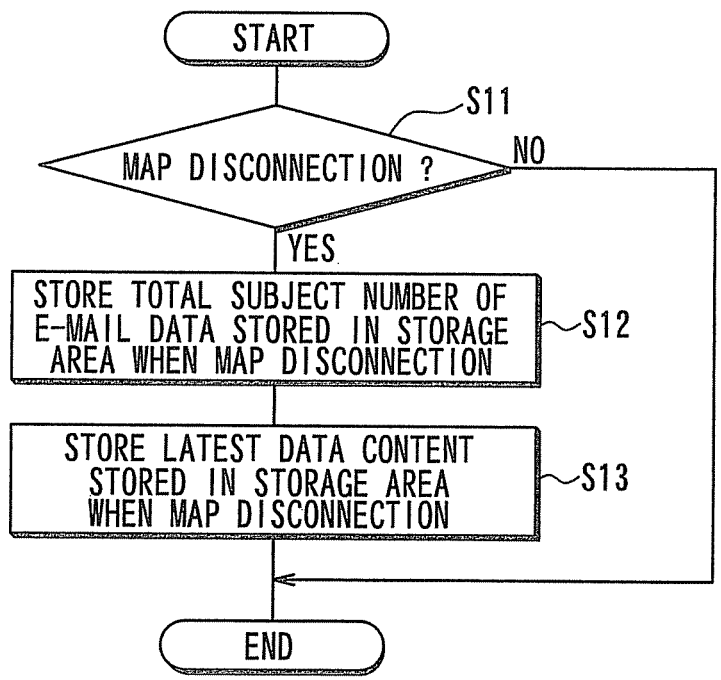
FIG. 3 is a flow chart showing a MAP disconnection monitor processing.

As follows, the operation of the above-described configuration will be described with reference to FIGS. 2 to 6. FIGS. 2 to 4 are flow charts each showing a processing implemented by the vehicular device 2.

When the device power source of the vehicular device 2 is activated and when the ACC switch device is activated, the control unit 4 implements a main processing. Specifically, the control unit 4 implements sub-processings including a MAP disconnection monitor processing at step S1 and a MAP connection monitor processing at step S2 in the main processing. The control unit 4 implements periodically the MAP disconnection monitor processing and the MAP connection monitor processing at a predetermined interval. As follows, the processings will be described. When the device power source of the vehicular device 2 is deactivated, the control unit 4 terminates the main processing.

(1) MAP Disconnection Monitor Processing

At a shift timing from the main processing to the MAP disconnection monitor processing, the control unit 4 starts MAP disconnection monitoring. When starting the MAP disconnection monitor processing, at step S11, the control unit 4 determines whether the MAP connection between the BT communication unit 5 and the cellular phone device 3 is disconnected. When the control unit 4 determines that the MAP connection between the BT communication unit 5 and the cellular phone device 3 is not disconnected (S11: NO), the control unit 4 terminates the MAP disconnection monitor processing and returns to the main processing.

For example, when a user deactivates the ACC switch device to stop the vehicular device 2 or when the wireless communication condition is not excellent, instantaneous disconnection of the BT communication channel may occur. In this case, the control unit 4 determines that the MAP connected between the BT communication unit 5 and the cellular phone device 3 is disconnected (S11: YES). Thus, at step S12, the control unit 4 causes the e-mail data storage area 6a to store the total number of the subjects of the e-mail data items at that time, as the total number of subjects of the e-mail data items when the MAP is disconnected. Subsequently, at step S13, the control unit 4 stores the data content of the latest e-mail data item stored in the e-mail data storage area at that time, as the data content of the latest e-mail data item when the MAP is disconnected. Thus, the control unit 4 terminates the MAP disconnection monitor processing and returns to the main processing.

(2) MAP Connection Monitor Processing

At a shift timing from the main processing to the MAP connection monitor processing, the control unit 4 starts the MAP connection monitoring. When starting the MAP connection monitor processing, at step S21, the control unit 4 determines whether the MAP connection is made between the BT communication unit 5 and the cellular phone device 3. When the control unit 4 determines that the MAP connection between the BT communication unit 5 and the cellular phone device 3 is not made (S21: NO), the control unit 4 terminates the MAP connection monitor processing and returns to the main processing.

For example, when a user activates the ACC switch device to start the vehicular device 2 or when the wireless communication condition being not excellent becomes excellent, connection of the BT communication channel is resumed. In this case, the control unit 4 determines that the MAP connection is made between the BT communication unit 5 and the cellular phone device 3 (S21: YES). Thus, at step S22, the control unit 4 causes the BT communication unit 5 to transmit the total subject number request command to the cellular phone device 3. Thereby, the control unit 4 causes the cellular phone device 3 to transfer the total number of the subjects of the e-mail data items stored in the cellular phone device 3. Thus, the control unit 4 retrieves the total number of the subjects of the e-mail data items transferred from the cellular phone device 3, as the total number of the subjects of the e-mail data items when the MAP is connected. Subsequently, at step S23, the control unit 4 causes the BT communication unit 5 to transmit the latest data content request command to the cellular phone device 3. Thereby, the control unit 4 causes the cellular phone device 3 to transfer the data content of the latest e-mail data item among the e-mail data items stored in the cellular phone device 3. Thus, the control unit 4 retrieves the data content of the latest e-mail data item transferred from the cellular phone device 3, as the data content of the latest e-mail data when the MAP is connected.

Subsequently, at step S24, the control unit 4 compares the total number of the subjects of the e-mail data items, when the MAP is disconnected, stored previously with the total number of the subjects of the retrieved e-mail data items when the MAP is connected. When the control unit 4 determines both the total numbers coincide with each other (S24: YES), at step S25, the control unit 4 compares the data content of the latest e-mail data, when the MAP is disconnected, stored previously with the data content of the retrieved latest e-mail data when the MAP is connected. When the control unit 4 determines that both the total numbers coincide with each other (S25: YES), the control unit 4 terminates the MAP connection monitor processing and returns to the main processing, without causing the BT communication unit 5 to transmit the e-mail data request command to the cellular phone device 3. That is, in this case, the control unit 4 terminates the MAP connection monitor processing, without implementing the e-mail data transfer processing and the e-mail data update processing.

Alternatively, it is supposed that the control unit 4 determines that the total number of the subjects of the e-mail data items, when the MAP is disconnected, stored previously does not coincide with the retrieved total number of the subjects of the e-mail data when the MAP is connected (S24: NO). Alternatively, it is supposed that the control unit 4 determines that the total number of the subjects of the e-mail data items, when the MAP is disconnected, stored previously coincides with the retrieved total number of the subjects of the e-mail data when the MAP is connected (S24: YES), nevertheless, the control unit 4 determines that the data content of the latest e-mail data item, when the MAP is disconnected, stored previously does not coincide with the data content of the retrieved latest e-mail data item when the MAP is connected (S25: NO). In these cases, the control unit 4 causes the BT communication unit 5 to transmit the e-mail data request command to the cellular phone device 3. Thereby, at step S26, the control unit 4 implements the e-mail data transfer processing to cause the cellular phone device 3 to transfer the e-mail data items. In addition, at step S27, the control unit 4 implements the e-mail data update processing to cause the e-mail data storage area 6a is to store (overwrite) the e-mail data items transferred from the cellular phone device 3 and retrieved by the BT communication unit 5. Thus, the control unit 4 updates the e-mail data items stored in the e-mail data storage area 6a. Thus, the control unit 4 terminates the MAP connection monitor processing and returns to the main processing.

In this way, the control unit 4 compares the total number of the subjects of the e-mail data items when the MAP is disconnected with the total number of the subjects of the e-mail data items when the MAP is connected. In addition, the control unit 4 further compares the data content of the latest e-mail data when the MAP is disconnected with the data content of the latest e-mail data when the MAP is connected. Thereby, the control unit 4 determines whether the e-mail data items are updated by the cellular phone device 3 in the time period when the MAP is not connected, i.e., in the time period during the MAP is disconnected. That is, the control unit 4 determines whether the e-mail data items are updated in the time period from the previous (immediately before) end of connection to the present connection start.

Figure 5A:
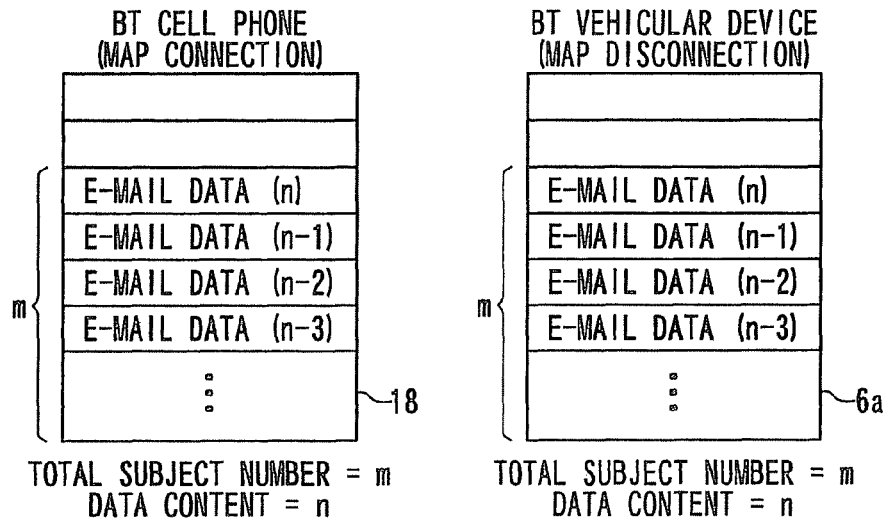
FIGS. 5A, 5B are views showing total number of e-mail data items and contents of the e-mail data items.

FIG. 5A shows a case where the e-mail data items are not updated by the cellular phone device 3 in the time period during the MAP is not connected. In this case, the total number (m) of the subjects of the e-mail data items when the MAP is disconnected coincides with the total number (m) of the subjects of the e-mail data items when the MAP is connected. In addition, in this case, the data content (n) of the latest e-mail data item when the MAP is disconnected coincides with the data content (n) of the latest e-mail data item when the MAP is connected. Therefore, the control unit 4 determines that the e-mail data items are not updated by the cellular phone device 3 in the period during the MAP is not connected. Thus, the control unit 4 does not implement the e-mail data transfer processing and the e-mail data update processing.

Figure 5B:
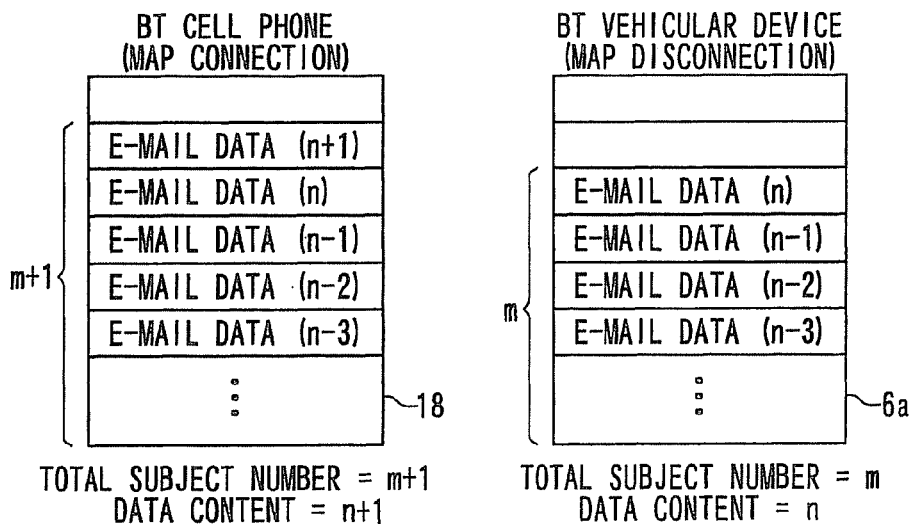

Alternatively, FIG. 5B shows a case where the e-mail data items are updated by the cellular phone device 3 in the time period during the MAP is not connected. In this case, when the cellular phone device 3 receives the new e-mail data item (n+1) from the communication network 19 in the period during the MAP is not connected, the total number (m) of the subjects of the e-mail data items when the MAP is disconnected does not coincide with the total number (m+1) of the subjects of the e-mail data items when the MAP is connected. In addition, in this case, the data content (n) of the latest e-mail data item when the MAP is disconnected does not coincide with the data content (n+1) of the latest e-mail data item when the MAP is connected. Therefore, the control unit 4 determines that the e-mail data items are updated by the cellular phone device 3 in the period during the MAP is not connected. Thus, the control unit 4 implements the e-mail data transfer processing and the e-mail data update processing.

Figure 6A:
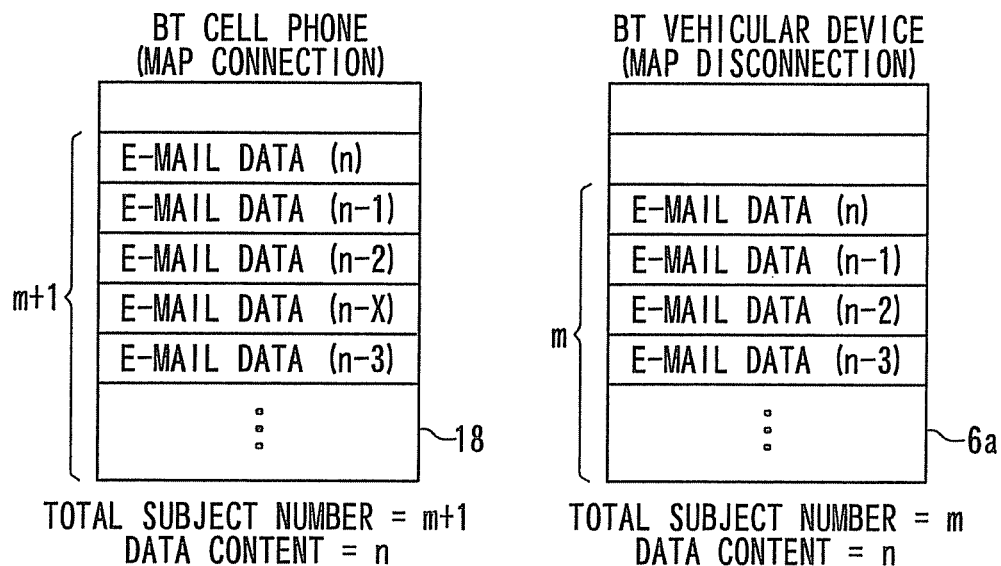
FIGS. 6A, 6B are views showing total number of e-mail data items and contents of the e-mail data items.

Alternatively, FIG. 6A shows a case where the cellular phone device 3 receives the new e-mail data item (n−X) being delayed relative to the e-mail data item (n) from the communication network 19 due to, for example, a defect of the email server, in the period during the MAP is not connected. In this case, the data content (n) of the latest e-mail data item when the MAP is disconnected coincides with the data content (n) of the latest e-mail data item when the MAP is connected. Nevertheless, the total number (m) of the subjects of the e-mail data items when the MAP is disconnected does not coincide with the total number (m+1) of the subjects of the e-mail data items when the MAP is connected. Therefore, the control unit 4 determines that the e-mail data items are updated by the cellular phone device 3 in the period during the MAP is not connected. Thus, the control unit 4 implements the e-mail data transfer processing and the e-mail data update processing.

Figure 6B:
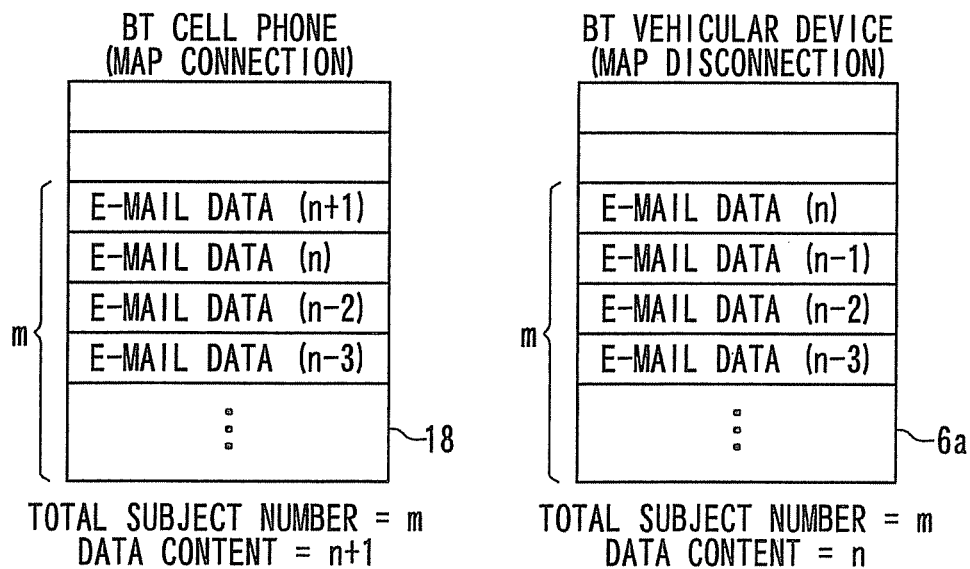

Alternatively, FIG. 6B shows a case where the cellular phone device 3 receives the new e-mail data item (n+1) from the communication network 19 and the e-mail data item (n−1) is deleted, in the time period during the MAP is not connected. In this case, the total number (m) of the subjects of the e-mail data items when the MAP is disconnected coincides with the total number (m) of the subjects of the e-mail data items when the MAP is connected. Nevertheless, in this case, the data content (n) of the latest e-mail data item when the MAP is disconnected does not coincide with the data content (n+1) of the latest e-mail data item when the MAP is connected. Therefore, the control unit 4 determines that the e-mail data items are updated by the cellular phone device 3 in the period during the MAP is not connected. Thus, the control unit 4 implements the e-mail data transfer processing and the e-mail data update processing.

According to the present embodiment as described above, when the MAP is connected between the vehicular device 2 and the cellular phone device 3, the total number of the subjects of the e-mail data items stored in the cellular phone device 3 at that time is compared with the total number of the subjects of the e-mail data items stored in the self-device. Further, in this case, the data content of the latest e-mail data item stored in the cellular phone device 3 is also compared with the data content of the latest e-mail data item stored in the self-device. Thereby, it is determined whether the e-mail data item is updated by the cellular phone device 3 in the time period during the MAP is not connected. When it is determined that the e-mail data item is not updated by the cellular phone device 3 in the time period during the MAP is not connected, the e-mail data transfer processing is not implemented. With the present configuration, a user can read the e-mail data item immediately after making the MAP connection. Thus, operability can be enhanced, and unnecessarily increase in processing load can be beforehand avoidable. In the configuration in which the vehicular device 2 and the cellular phone device 3 implement the BT communications therebetween, it is assumable that instantaneous disconnection occurs in the BT communication channel. Therefore, the above-described feature is significantly effective.

Further, when it is determined that the e-mail data item is updated by the cellular phone device 3 in the time period during the MAP is not connected, the e-mail data transfer processing is implemented, and the e-mail data update processing is implemented. With the present configuration, the e-mail data item can be synchronized with the cellular phone device 3.

The present invention is not limited to the embodiment, and may be transformed or extended as follows.

The vehicular device may be another device having a function to implement near-field wireless communications with a cellular phone device and a function to retrieve e-mail data transferred from the cellular phone device and to store the retrieved e-mail data. For example, the vehicular device may be a navigation device having a generally-known navigation function.

The cellular phone device may be a portable device, such as a personal digital assistant, having a function to implement near-field wireless communications with the vehicular device and to transfer e-mail data to a vehicular device.

It is not limited to use the BT communications between the vehicular device and the cellular phone device. The vehicular device and the cellular phone device may use another type of near-field wireless communications.

The vehicular device may be configured to indicate a message such as "e-mail data item is transferred, since the e-mail data item of the cellular phone device is updated", when the e-mail data transfer processing is implemented, thereby to notify a user of implementation of the e-mail data transfer processing. The vehicular device may be further configured to indicate a message such as "e-mail data item is not transferred, since the e-mail data item of the cellular phone device is not updated", when the e-mail data transfer processing is not implemented, thereby to notify a user of non-implementation of the e-mail data transfer processing. With the present configuration, the user can be notified whether the e-mail data item is can be browsed immediately after the MAP connection. Thus, operability can be further enhanced.

Summarizing the above embodiment, the communication unit is configured to connect the e-mail data transfer protocol to transfer e-mail data items with the external device configured to store the e-mail data item. The e-mail data retrieval unit is configured to retrieve the e-mail data items transferred from the external device in the state where the e-mail data transfer protocol is connected between the communication unit and the external device. The e-mail data storage unit is configured to store the e-mail data items transferred from the external device and retrieved by the e-mail data retrieval unit. The control unit is configured to: i) implement the e-mail data transfer processing to cause the external device to transfer the e-mail data items; and ii) implement the e-mail data update processing to update the e-mail data items stored in the e-mail data storage unit to the e-mail data items transferred from the external device and retrieved by the e-mail data retrieval unit.

The e-mail total subject number retrieval unit is configured to retrieve the total number of subjects of the e-mail data items stored in the external device when the e-mail data transfer protocol is connected between the communication unit and the external device. The latest data content retrieval unit is configured to retrieve a data content of the latest e-mail data item stored in the external device when the e-mail data transfer protocol is connected between the communication unit and the external device.

The control unit is further configured not to implement the e-mail data transfer processing, when the e-mail data transfer protocol is connected between the communication unit and the external device, and when the following both conditions are satisfied:

i) the total number of the subjects of the e-mail data items stored in the external device at the time point when the e-mail data transfer protocol is connected, the total number being retrieved by the e-mail total subject number retrieval unit from the external device, coincides with the total number of the subjects of the e-mail data items stored in the e-mail data storage unit at the time point when the e-mail data transfer protocol is connected; and ii) the data content of the latest e-mail data stored in the external device at the time point when the e-mail data transfer protocol is connected, the data content of the latest e-mail data being retrieved by the latest data content retrieval unit from the external device, coincides with the data content of the latest e-mail data stored in the e-mail data storage unit at the time point when the e-mail data transfer protocol is connected.

With the present configuration, even when the e-mail data transfer protocol is connected between the e-mail data processing device and the external device, the control unit determines that the external device does not update the e-mail data items in the time period in which the e-mail data transfer protocol is not connected, when the following both of two conditions are satisfied:

i) the total number of the subjects of the e-mail data items stored in the external device at the time point coincides with the total number of the subjects of the e-mail data items stored in the e-mail data processing device; and ii) the data content of the latest e-mail data item stored in the external device at the time point coincides with the data content of the latest e-mail data item stored in the e-mail data processing device.

That is, in this case, the control unit determines that the external device does not update the e-mail data items in the time period in which the e-mail data transfer protocol is disconnected, i.e., in the time period from the previous (immediately before) end of connection to this connection start. Thus, the e-mail data processing device does not implement the e-mail data transfer processing, in this case. In this way, a user is enabled to read the e-mail data items immediately after the connection of the e-mail data transfer protocol is made. Thus, operability of the e-mail data processing device can be enhanced. Further, increase in unnecessary processing load can be avoidable beforehand.

The control unit may be further configured to implement the e-mail data transfer processing and implement the e-mail data update processing, when the e-mail data transfer protocol is connected between the communication unit and the external device, and when at least one of the following conditions is satisfied:

i) the total number of the subjects of the e-mail data items stored in the external device at the time point when the e-mail data transfer protocol is connected, the total number being retrieved by the e-mail total subject number retrieval unit from the external device, does not coincide with the total number of the subjects of the e-mail data items stored in the e-mail data storage unit at the time point when the e-mail data transfer protocol is connected; and ii) the data content of the latest e-mail data stored in the external device at the time point when the e-mail data transfer protocol is connected, the data content of the latest e-mail data being retrieved by the latest data content retrieval unit from the external device, does not coincide with the data content of the latest e-mail data stored in the e-mail data storage unit at the time point when the e-mail data transfer protocol is connected.

With the present configuration, even when the e-mail data transfer protocol is connected between the e-mail data processing device and the external device, the control unit determines that the external device updates the e-mail data items in the time period in which the e-mail data transfer protocol is not connected, when at least one of the following conditions are satisfied:

i) the total number of the subjects of the e-mail data items stored in the external device at the time point does not coincide with the total number of the subjects of the e-mail data items stored in the e-mail data processing device; and ii) the data content of the latest e-mail data item stored in the external device at the time point does not coincide with the data content of the latest e-mail data item stored in the e-mail data processing device.

Thus, the e-mail data processing device determines that the e-mail data items are updated in the external device in the time period in which the e-mail data transfer protocol is not connected. Therefore, the e-mail data processing device implements the e-mail data transfer processing and the e-mail data update processing. Thereby, the e-mail data can be synchronized between the e-mail data processing device and the external device.

The above processings such as calculations and determinations are not limited being executed by the control unit 4. The control unit may have various structures including the control unit 4 shown as an example. The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An electronic mail data processing device comprising:
   a control unit including a microcomputer mounted in a vehicle;
   a communication unit in communication with the control unit, the communication unit configured to wirelessly connect an e-mail data transfer protocol to transfer e-mail data items with an external device separate from the electronic mail data processing device, the external device configured to store the e-mail data items;
   an e-mail data retrieval unit executed by the microcomputer to retrieve the e-mail data items transferred from the external device when the e-mail data transfer protocol is connected between the communication unit and the external device;
   an e-mail data storage unit executed by the microcomputer in communication with the control unit, the e-mail storage unit to store the e-mail data items transferred from the external device and retrieved by the e-mail data retrieval unit;
   the control unit executed by the microcomputer to:
   implement an e-mail data transfer process to cause the external device to transfer the e-mail data items; and
   implement an e-mail data update process to update the e-mail data items stored in the e-mail data storage unit to the e-mail data items transferred from the external device and retrieved by the e-mail data retrieval unit;
   an e-mail total subject number retrieval unit executed by the microcomputer to retrieve a total number of subjects of the e-mail data items stored in the external device when the e-mail data transfer protocol is connected between the communication unit and the external device; and
   a latest data content retrieval unit executed by the microcomputer to retrieve a data content of only a latest e-mail data item stored in the external device from among the e-mail data items when the e-mail data transfer protocol is connected between the communication unit and the external device, wherein
   when the e-mail data transfer protocol is disconnected between the communication unit and the external device, the control unit is configured to store, in the e-mail data storage unit, the total number of subjects of the e-mail data items stored in the external device, as a previous total number of subjects of the e-mail data items, and store the data content of only the latest e-mail data item from among the e-mail data items stored in the external device, as a previous data content of the latest e-mail data;
   the control unit is further configured not to implement the e-mail data transfer process, when the e-mail data transfer protocol is connected between the communication unit and the external device, and when the following both conditions are satisfied:
   i) a current total number of subjects of the e-mail data items stored in the external device coincides with the previous total number of subjects of the e-mail data items stored in the e-mail data storage unit at a previous disconnection of the e-mail data transfer protocol, and the current total number of subjects of the e-mail data items is retrieved by the e-mail total subject number retrieval unit from the external device at a point in time when the e-mail data transfer protocol is connected after the previous disconnection; and
   ii) a data content of a current latest e-mail data item from among the e-mail data items stored in the external device coincides with the previous data content of the latest e-mail data item stored in the e-mail data storage unit at the previous disconnection of the e-mail data transfer protocol, and the data content of the current latest e-mail data item is retrieved by the latest data content retrieval unit from the external device at the point in time when the e-mail data transfer protocol is connected after the previous disconnection; and
   the data content includes at least one of a subject and a body text of the latest e-mail data item.

2. The electronic mail data processing device according to claim 1, wherein the control unit is further configured to implement the e-mail data transfer processing, and implement the e-mail data update processing, when the e-mail data transfer protocol is connected between the communication unit and the external device, and when at least one of the following conditions is satisfied:
   i) the current total number of subjects of the e-mail data items stored in the external device does not coincide with the previous total number of subjects of the e-mail data items stored in the e-mail data storage unit at the previous disconnection of the e-mail data transfer protocol; and ii) the data content of the current latest e-mail data item from among the e-mail data items stored in the external device does not coincide with the previous data content of the latest e-mail data item stored in the e-mail data storage unit at the previous disconnection of the e-mail data transfer protocol.

3. The electronic mail data processing device according to claim 1, wherein the control unit includes:

a first determination unit configured to determine whether the current total number of the subjects of the e-mail data items stored in the external device at the point in time when the e-mail data transfer protocol is connected after the previous disconnection coincides with the previous total number of subjects of the e-mail data items stored in the e-mail data storage unit at the previous disconnection of the e-mail data transfer protocol;

a second determination unit configured to determine whether the data content of the current latest e-mail data item from among the e-mail data items stored in the external device at the point in time when the e-mail data transfer protocol is connected after the previous disconnection coincides with the previous data content of the latest e-mail data item stored in the e-mail data storage unit at the previous disconnection of the e-mail data transfer protocol;

a third determination unit configured:
to determine that the external device does not update the e-mail data items in a time period in which the e-mail data transfer protocol is not previously connected, when both the first determination unit and the second determination unit make positive determinations; and
not to cause the control unit to implement the e-mail data transfer processing; and a fourth determination unit configured:
to determine that the external device updates the e-mail data items in the time period in which the e-mail data transfer protocol is not previously connected, when at least one of the first determination unit and the second determination unit makes a negative determination; and
to cause the control unit to implement the e-mail data transfer processing and implement the e-mail data update processing.

4. The electronic mail data processing device according to claim 1, wherein the control unit uses only the latest e-mail data item stored in the external device and only the latest e-mail data item stored in the e-mail data storage unit at the point in time when the e-mail data transfer is connected.

5. The electronic mail data processing device according to claim 1, wherein the control unit stores the previous total number of subjects of the e-mail data items and the previous data content of the latest e-mail data only at a time point when the e-mail data transfer protocol is disconnected between the communication unit and the external device.

6. A method for processing electronic mail data, the method comprising:

providing a control unit including a microcomputer mounted in a vehicle;

wirelessly connecting an e-mail data transfer protocol to transfer e-mail data items between an electronic mail data processing device and an external device separate from the electronic mail data processing unit, the external device storing the e-mail data items using a communication unit in communication with the control unit;

instructing the electronic mail data processing device to retrieve the e-mail data items transferred from the external device when the e-mail data transfer protocol is connected;

instructing the electronic mail data processing device to store the e-mail data items transferred and retrieved from the external device in an e-mail data storage unit in communication with the control unit;

instructing the electronic mail data processing device to retrieve a total number of subjects of the e-mail data items stored in the external device when the e-mail data transfer protocol is connected;

instructing the electronic mail data processing device to retrieve a data content of only a latest e-mail data item from among email data items stored in the external device when the e-mail data transfer protocol is connected;

instructing the electronic mail data processing device to store the total number of subjects of the e-mail data items stored in the external device, as a previous total number of subjects of the e-mail data items, and store the data content of only the latest e-mail data item from among the e-mail data items stored in the external device, as a previous data content of the latest e-mail data when the e-mail data transfer protocol is disconnected;

first determining whether a current total number of subjects of the e-mail data items stored in the external device coincides with the previous total number of subjects of the e-mail data items stored in the electronic mail data processing device at a previous disconnection of the e-mail data transfer protocol, wherein the current total number of subjects of the e-mail data items is retrieved from the external device at a point in time when the e-mail data transfer protocol is connected after the previous disconnection;

second determining whether a data content of a current latest e-mail data item stored in the external device coincides with the previous data content of the latest e-mail data stored in the electronic mail data processing device at the previous disconnection of the e-mail data transfer protocol, wherein the data content of the current latest e-mail data item is retrieved from the external device at the point in time when the e-mail data transfer protocol is connected after the previous disconnection;

avoiding implementation of an e-mail data transfer process, which causes the external device to transfer the e-mail data items to the electronic mail data processing device, when the e-mail data transfer protocol is connected, and when both the first determining and the second determining make positive determinations; and implementing the e-mail data transfer process to cause the external device to transfer the e-mail data items to the electronic mail data processing device and implementing an e-mail data update process to update the e-mail data items stored in the electronic mail data processing device to the e-mail data items transferred from the external device and retrieved by the electronic mail data processing device when at least one of the first determining and the second determining makes a negative determination, wherein the data content includes at least one of a subject and a body text of the latest e-mail data item.

7. The electronic mail data processing device according to claim 6, wherein the control unit stores the previous total number of subjects of the e-mail data items and the previous data content of the latest e-mail data only at a time point when the e-mail data transfer protocol is disconnected between the communication unit and the external device.

8. A non-transitory computer readable medium comprising instructions executed by a computer, the instructions including the method according to claim 6.

9. An electronic mail data processing device mounted in a vehicle to define a vehicle device, the electronic mail data processing device comprising:

a communication section of the vehicle device connecting an e-mail data transfer protocol to transfer e-mail data items with an external device separate from the vehicle storing the e-mail data items;

an email data retrieval section of the vehicle device retrieving the e-mail data items transferred from the external device when the e-mail data transfer protocol is connected between the communication section and the external device;

an e-mail data storage section of the vehicle device storing the e-mail data items transferred from the external device and retrieved by the e-mail data retrieval section;

a control section of the vehicle device including a microcomputer, the control section:

implementing an e-mail data transfer process causing the external device to transfer the e-mail data items; and implementing an e-mail data update process updating the e-mail data items stored in the e-mail data storage section to the e-mail data items transferred from the external device and retrieved by the e-mail data retrieval section;

an e-mail total subject number retrieval section of the vehicle device retrieving a total number of subjects of the e-mail data items stored in the external device when the e-mail data transfer protocol is connected between the communication section and the external device; and a latest data content retrieval section of the vehicle device retrieving a data content of only a latest e-mail data item stored in the external device from among the e-mail data items when the e-mail data transfer protocol is connected between the communication section and the external device, wherein when the e-mail data transfer protocol is disconnected between the communication section and the external device, the control section stores, in the e-mail data storage section, the total number of subjects of the e-mail data items stored in the external device, as a previous total number of subjects of the e-mail data items, and stores the data content of only the latest e-mail data item from among the e-mail data items stored in the external device, as a previous data content of the latest e-mail data;

the control section further implements the e-mail data transfer process, when the e-mail data transfer protocol is connected between the communication section and the external device, and when the following both conditions are satisfied:

i) a current total number of subjects of the e-mail data items stored in the external device coincides with the previous total number of subjects of the e-mail data items stored in the e-mail data storage section at a previous disconnection of the e-mail data transfer protocol, and the current total number of subjects of the e-mail data items is retrieved by the e-mail total subject number retrieval section from the external device at a point in time when the e-mail data transfer protocol is connected after the previous disconnection; and ii) a data content of a current latest e-mail data item from among the e-mail data items stored in the external device coincides with the previous data content of the latest e-mail data item stored in the e-mail data storage section at the previous disconnection of the e-mail data transfer protocol, and the data content of the current latest e-mail data item is retrieved by the latest data content retrieval section from the external device at the point in time when the e-mail data transfer protocol is connected after the previous disconnection; and the data content includes at least one of a subject and a body text of the latest e-mail data item.

10. The electronic mail data processing device according to claim 9, wherein the control unit stores the previous total number of subjects of the e-mail data items and the previous data content of the latest e-mail data only at a time point when the e-mail data transfer protocol is disconnected between the communication unit and the external device.

* * * * *